US011957938B1

(12) United States Patent
Walther

(10) Patent No.: US 11,957,938 B1
(45) Date of Patent: Apr. 16, 2024

(54) HYDRATION PROVIDING MASK APPARATUS

(71) Applicant: Eric Oztochane Walther, Fremont, CA (US)

(72) Inventor: Eric Oztochane Walther, Fremont, CA (US)

( * ) Notice: Subject to any disclaimer, the term of this patent is extended or adjusted under 35 U.S.C. 154(b) by 278 days.

(21) Appl. No.: 17/470,872

(22) Filed: Sep. 9, 2021

(51) Int. Cl.

| | |
|---|---|
| ***A62B 18/00*** | (2006.01) |
| ***A41D 13/11*** | (2006.01) |
| ***A62B 9/06*** | (2006.01) |
| ***A62B 18/08*** | (2006.01) |
| ***A62B 23/02*** | (2006.01) |
| ***H04R 1/02*** | (2006.01) |
| *A62B 7/00* | (2006.01) |
| *A62B 18/10* | (2006.01) |

(52) U.S. Cl.
CPC ............ *A62B 18/086* (2013.01); *A41D 13/11* (2013.01); *A62B 9/06* (2013.01); *A62B 18/084* (2013.01); *A62B 23/02* (2013.01); *H04R 1/028* (2013.01); *A62B 7/00* (2013.01); *A62B 18/10* (2013.01)

(58) Field of Classification Search
CPC ....... A62B 18/086; A62B 9/06; A62B 18/084; A62B 23/02; A62B 7/00; A62B 18/10; A41D 13/11; H04R 1/028
See application file for complete search history.

(56) References Cited

U.S. PATENT DOCUMENTS

| | | | | |
|---|---|---|---|---|
| 4,712,594 A * | 12/1987 | Schneider | A45F 3/18 | 220/666 |
| 10,980,296 B1 * | 4/2021 | Hosac | A62B 18/10 | |
| 11,738,219 B2 * | 8/2023 | Bergeron | A62B 18/08 | 128/205.12 |
| 2008/0093399 A1 * | 4/2008 | Resnick | A62B 18/086 | 224/148.2 |
| 2008/0276933 A1 * | 11/2008 | Dampney | A42B 3/28 | 2/202 |
| 2016/0074683 A1 * | 3/2016 | Bergeron | A62B 23/025 | 128/205.12 |
| 2020/0298032 A1 * | 9/2020 | Torbenson | A62B 18/025 | |
| 2021/0331000 A1 * | 10/2021 | Gilner | A62B 18/086 | |

* cited by examiner

*Primary Examiner* — Steven O Douglas

(57) ABSTRACT

A mask apparatus, including a mask formed of a rigid or semi-rigid material. The mask includes a seal disposed around the perimeter of the mask. The mask apparatus includes a breathable air mechanism detachably coupled to a front surface of the mask. The mask apparatus further includes a hydration assembly to be coupled to an external hydration source and one or more couplings to position and secure the mask apparatus.

20 Claims, 2 Drawing Sheets

HYDRATION PROVIDING MASK APPARATUS

TECHNICAL FIELD

Aspects and implementations of the present disclosure relate to a mask apparatus and, in particular, to a hydration providing mask apparatus.

BACKGROUND

A mask apparatus, also referred to as a respirator, is a device designed to protect a wearer from inhaling hazardous atmospheres. A respirator may be either an air-purifying respirator in which breathable air is obtained by filtering a contaminated atmosphere or an air-supplied respirator in which an alternate supply of breathable air is provided.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Aspects and implementations of the disclosure are directed to a hydration providing mask apparatus (also referred to as "respirator" hereafter). The mask apparatus may protect a wearer of the mask apparatus from inhaling hazardous atmospheres, such as hazardous fumes, vapors, gases, particular matter, or airborne microorganisms. The mask apparatus may include a hydration assembly that may provide hydration to the wearer of the mask.

A conventional respirator may include a mask that is worn by a user and covers the user's nose and mouth to prevent the inhalation of hazardous environments. The mask may include either a filter that filters the hazardous atmosphere to produce breathable air, or an oxygen port that facilitates the delivery of breathable air from an external source, such as an oxygen or compressed air tank. Because the conventional respirator covers the user's nose and mouth, the user is unable to hydrate themselves without removal of the conventional respirator. This may result in the user exposing themselves to the hazardous atmosphere when the conventional respirator is removed and/or may result in the user being unable to hydrate when working in a hazardous atmosphere. This may result in serious health issues, particularly for medical professionals and first responders who are required to wear respirators for prolonged periods of time.

Embodiments described herein may create an improved mask apparatus that enables the user to hydrate without having to remove the mask apparatus. The mask apparatus may include a mask that is secured to the user's face. The mask may cover the user's nose and mouth and may include a seal around the perimeter of the mask to prevent the ingress of hazardous materials. The mask apparatus may further include tubing and a coupling that are external to the mask and may be coupled to a hydration source, such as a water or fluid storage container. The tubing may be coupled to the mask via a hydration port, which is coupled to additional tubing and a mouthpiece contained within the sealed environment of the mask apparatus.

The wearer of the mask can consume the liquids from the hydration source while wearing the mask apparatus using the integrated mouthpiece. This allows the user to remain hydrated while working in hazardous atmospheres, without the risk of exposure that may result from the user having to remove the mask apparatus to consume the liquids.

Figure 1:
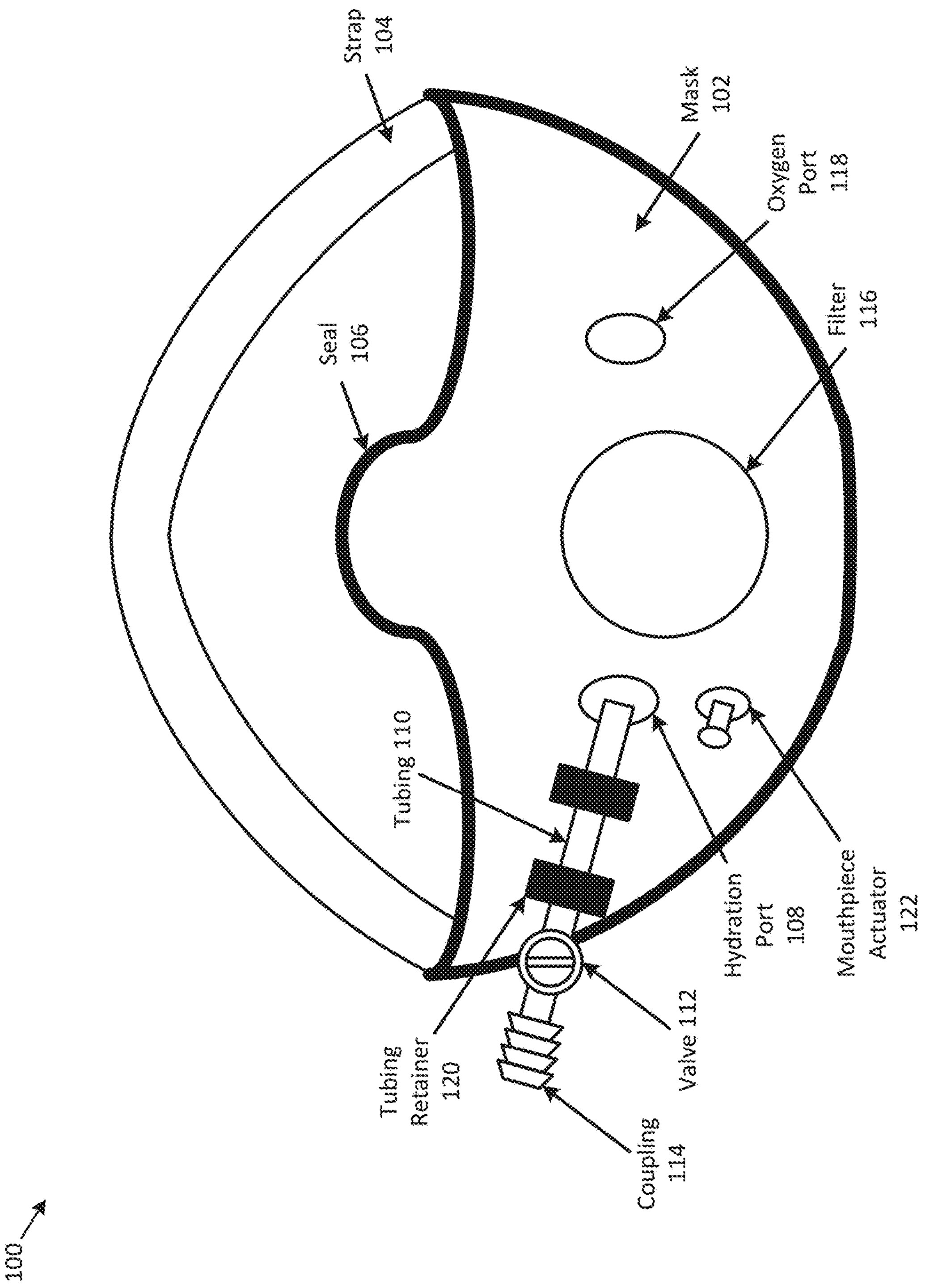
FIG. 1 is an illustration of an example of a mask apparatus including a hydration assembly, in accordance with embodiments of the disclosure.

FIG. 1 is an illustration of an example of a mask apparatus 100 including a hydration assembly, in accordance with embodiments of the disclosure. The mask apparatus 100 may include a mask 102 that is formed of a rigid or semi-rigid material. Examples of rigid or semi-rigid materials that may be used to form the mask 102 may include, but are not limited to, polymers, plastics, metals, or metallic alloys. The mask 102 may serve as a barrier to prevent the ingress of materials from the atmosphere surrounding the mask apparatus 100 to the inside of the mask apparatus 100.

The mask apparatus 100 may further include a seal 106 that is disposed around the perimeter of mask 102 to create a seal between the mask apparatus 100 and the face of a wearer of the mask, further preventing the ingress of materials from the atmosphere surrounding the mask apparatus 100. In some embodiments, the seal 106 may be formed of a neoprene material. In embodiments, the seal 106 may be formed of silicone, rubber, or other types of polymers. In an embodiment, the seal 106 may be formed of any material capable of forming a hermetic seal between the mask 102 and the face of a wearer of the mask apparatus 100.

The mask apparatus 100 may include a strap 104 that is coupled to opposite ends of the mask 102. The strap 104 may be placed around the head of a wearer to secure the mask apparatus 100 to the wearer's face. In some embodiments, the strap 104 may be formed of an elastic material. In embodiments, the strap 104 may be an adjustable strap. In an embodiment, the strap 104 may include one or more couplings, such as buckles, snaps, or Velcro™, to enable strap 104 to be opened and closed. Although a singular strap 104 is shown in FIG. 1, embodiments of the disclosure may include mask apparatuses that include multiple straps.

In embodiments, the mask apparatus 100 may include one or more couplings, such as clips, buckles, etc., that may be used instead of or in conjunction with the strap 104. For example, the mask apparatus 100 may include clips on opposite sides of the mask 102 that may be coupled to a helmet worn by the wearer of the mask apparatus 100.

The mask apparatus 100 may further include a breathable air mechanism that provides a wearer of the mask apparatus 100 with breathable air. In some embodiments, the breathable air mechanism may be a filter 116. As previously described, in an air-purifying respirator, breathable air is obtained by filtering a contaminated atmosphere using a filter 116. In embodiments, the filter 116 may be detachably coupled to the front surface of the mask 102 to enable the replacement of filter 116. For example, filter 116 may be detachably coupled to the mask 102 via a threaded receptacle, quick connect, or other type of detachable coupling. In embodiments, the filter 116 may be a charcoal filter. In some embodiments, the filter 116 may be a gas and vapor filter. In embodiments, the filter 116 may be a particulate filter. In an embodiment, the filter 116 may be a gas, vapor, and particulate filter.

In an embodiment, the breathable air mechanism may be an oxygen port 118 that is to be coupled to an external source (not shown) of breathable air. As previously described, in an air-supplied respirator an alternate supply of breathable air is provided. The oxygen port 118 may serve as a detachable coupling between the mask apparatus 100 and the external source of breathable air. For example, tubing (not shown) from an oxygen or compressed air tank worn by a wearer of the mask apparatus 100 may be detachably coupled to the mask apparatus 100 via the oxygen port 118 to provide the wearer with the breathable air from the oxygen or compressed air tank.

The mask apparatus 100 may include a hydration assembly that includes hydration port 108, tubing 110, valve 112, coupling 114, and tubing retainer 120. The hydration assembly may be configured to couple to an external hydration source, such as a water or fluid storage container. The hydration port 108 may be a detachable coupling positioned on the front surface of the mask 102 to enable to connection of the tubing 110. The tubing 110 may serve as a straw to facilitate the delivery of fluids from the hydration source to the wearer of the mask apparatus 100. In embodiments, the tubing 110 may be formed of a plastic or polymer material. The valve 112 may be coupled to an end of the tubing 110 and may be used to prevent or permit the flow of fluid from the hydration source to the wearer of the mask apparatus 100. In embodiments, the valve 112 may be a ball valve, check valve, butterfly valve, gate valve, globe valve, needle valve, pinch valve, or any other type of valve. The coupling 114 may facilitate the connection between the tubing 110 and/or valve 112 of the hydration assembly with the external hydration source. In embodiments, the coupling 114 may be a barbed coupling, a quick-connect coupling, a push to connect coupling, a beaded coupling, a pipe thread coupling, a straight thread coupling, an O-ring coupling, or any other type of coupling. The tubing retainer 120 may be a strap, bracket, clip, or other type of retainer that is coupled to the front surface of the mask 102. The tubing retainer 120 may be configured to retain the tubing 110 in a desired position and prevent the tubing 122 from being snagged on objects in the environment surrounding the mask apparatus 100. It should be noted that embodiments of the disclosure may include hydration assemblies that do not include all of the components shown in FIG. 1. For example, embodiments of the disclosure may include a hydration assembly that includes a hydration port 108, tubing 110, and tubing retainer 120, without having a valve 112 and coupling 114.

In embodiments, the mask apparatus 100 may include a mouthpiece actuator 122 that may be used by a wearer of the mask apparatus 100 to position a mouthpiece (not shown) to provide hydration to the wearer of the mask apparatus 100. Further details with regards to the mouthpiece actuator 122 are described at FIG. 2 below.

Figure 2:
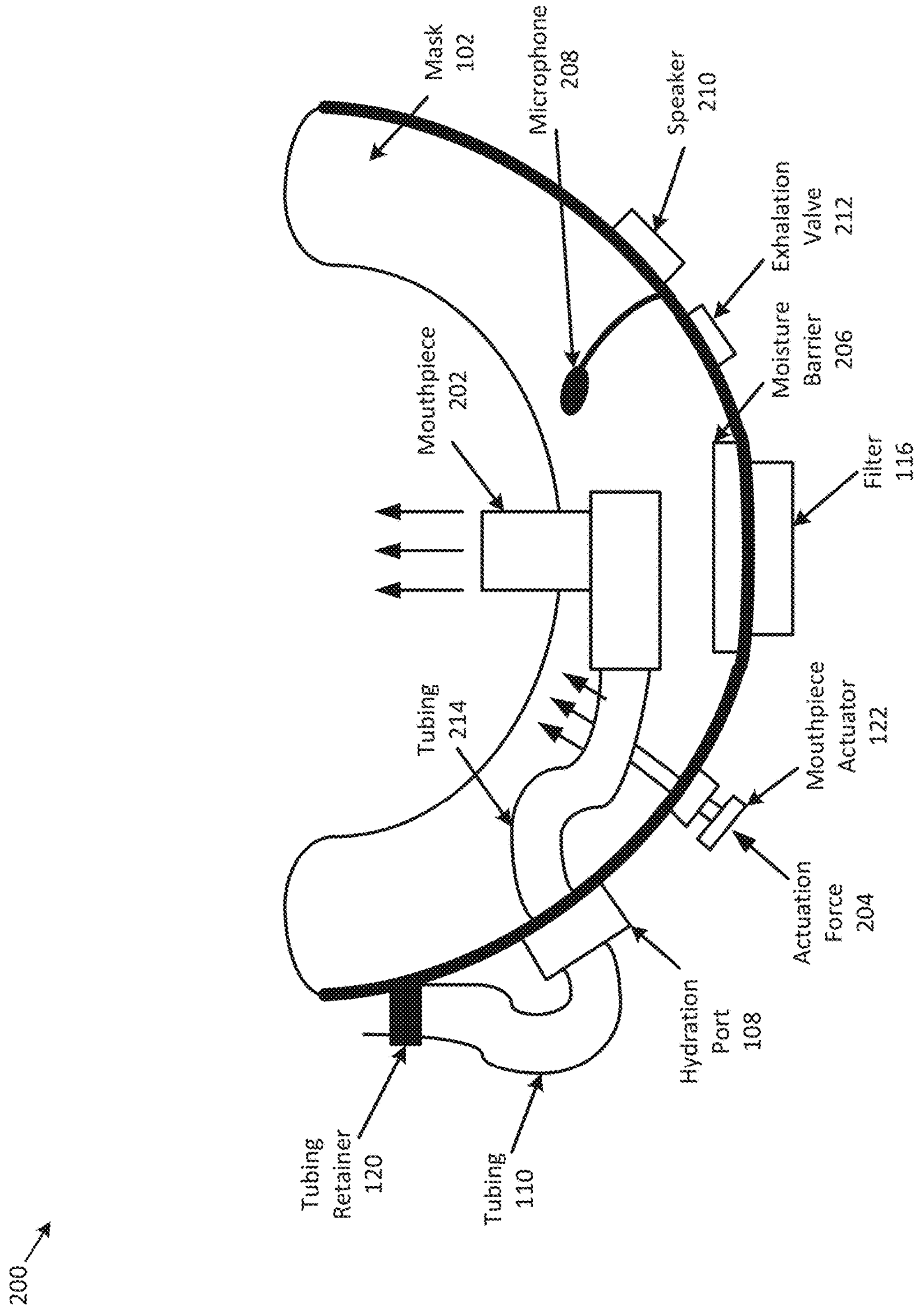
FIG. 2 is an illustration of an example of a top-down view of a mask apparatus including a hydration assembly, in accordance with embodiments of the disclosure.

FIG. 2 is an illustration of an example of a top-down view of a mask apparatus 200 including a hydration assembly, in accordance with embodiments of the disclosure. The mask apparatus 200 may include mask 102, hydration port 108, tubing 110, tubing retainer 120, and mouthpiece actuator 122, as previously described at FIG. 1. The top-down view of the mask apparatus 200 provides an illustrative example of the components contained within the mask apparatus 200, in accordance with some embodiments.

The mask apparatus 200 includes a mouthpiece 202 and tubing 214 that may be used to provide hydration to a wearer of the mask apparatus 200. The tubing 214 may be coupled to the hydration port 108 at the inner surface of mask 102 and receive fluids provided from the external hydration source via tubing 110. In embodiments, the tubing 214 may be formed of a plastic or polymer material. The mouthpiece 202 may be configured to go into the mouth of the wearer of the mask apparatus 200 to provide hydration to the wearer. When the mouthpiece 202 is in the mouth of the wearer, the wearer may generate suction to consume the fluids from the external hydration source via the tubing 110, hydration port 108, and tubing 214.

In some embodiments, a wearer of the mask apparatus 200 may not want the mouthpiece 202 to be in the wearer's mouth the entire time the wearer is wearing the mask apparatus 200. For example, a wearer of the mask apparatus 200 may find it difficult to talk or communicate while the mouthpiece 202 is in their mouth. In embodiments, the mask apparatus 200 may include a mouthpiece actuator 122 that may be depressed with an actuation force 204. When the actuation force 204 is applied to the mouthpiece actuator 122, the actuator force 204 may be applied to tubing 214 and/or mouthpiece 202, causing the mouthpiece 202 to move in a vertical direction into the wearer's mouth, as is illustrated by the arrows shown in FIG. 2. In some embodiments, the mouthpiece actuator 122 may include a mechanism, such as a spring, that will cause the tubing 214 and mouthpiece 202 to move down vertically (e.g., out of the wearer's mouth) when the actuation force 204 is removed from the mouthpiece actuator 122.

In embodiments, the mask apparatus 200 may include a microphone 208 to convert soundwaves generated by the speech of the wearer of the mask apparatus into electrical energy variations. In some embodiments, the electrical energy variations may be provided to a speaker 210 positioned on the front surface of the mask 102. The speaker 210 may convert the electrical energy variations received from the microphone 208 into a corresponding sound, which may make the speech or other noises generated by the wearer (and received by microphone 208) easier to hear while the mask apparatus 200 is being worn. In an embodiment, the electrical energy variations generated by the microphone 208 may be provided to a wireless communication system (not shown). For example, the electrical energy variations may be provided to a wireless radio, cellular phone, tablet, etc. to be subsequently transmitted by the wireless communication system.

In some embodiments, the mask apparatus 200 may include a moisture barrier 206 positioned on the inner surface of the mask 102. Some types of filters that may be used by the mask apparatus 200 may be sensitive to moisture that may be present when the wearer of the mask apparatus 200 exhales. To protect the filter 116, the moisture barrier 206 may reduce or eliminate the amount of moisture provided to the filter 116 due to exhalation by the wearer. In embodiments, the moisture barrier 206 may be one or more louvres that divert the moisture away from the filter 116. In an embodiment, the moisture barrier 206 may be a check valve that allows air to pass through the filter 116 and into the mask 102 when the wearer inhales, but prevents air from passing through to the filter 116 when the wearer exhales. In embodiments, other types of barriers may be used to reduce or prevent the amount of moisture filter 116 is exposed to.

In embodiments, the mask apparatus 200 may include an exhalation valve 212 positioned on the front surface of the mask 102. The exhalation valve 212 may enable air that is exhaled by the wearer to exit the inner atmosphere of the mask apparatus 200. The exhalation valve 212 may prevent the flow of air into the mask apparatus 200, but may allow the flow of air out of the mask apparatus 200. Although a single exhalation valve 212 is shown in FIG. 2, embodiments of the disclosure may include any number of check valves.

It should be noted that the components and configurations in FIGS. 1 and 2 above are shown for illustrative purposes only and are not meant to limit the disclosure. Embodiments of the disclosure may include mask apparatuses having different combinations of the above-disclosed components (or other components) in various configurations to provide a mask apparatus that is configured to provide hydration to a wearer of the mask apparatus.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A mask apparatus, comprising:

a mask formed of a rigid or semi-rigid material, the mask comprising a seal disposed around a perimeter of the mask;

a breathable air mechanism detachably coupled to a front surface of the mask;

a hydration assembly to be coupled to an external hydration source;

one or more couplings to position and secure the mask apparatus; and a moisture barrier positioned on a rear surface of the mask, the moisture barrier to protect a filter detachably coupled to the mask from moisture.

2. The mask apparatus of claim 1, wherein the breathable air mechanism comprises the filter.

3. The mask apparatus of claim 1, wherein the breathable air mechanism comprises an external air source detachably coupled to an oxygen port positioned on the front surface of the mask.

4. The mask apparatus of claim 1, wherein the hydration assembly comprises:

a mouthpiece;

a first tubing coupled to the mouthpiece;

a hydration port coupled to the first tubing; and a second tubing detachably coupled to the hydration port.

5. The mask apparatus of claim 4, further comprising:

one or more tubing retainers coupled to the front surface of the mask, the one or more tubing retainers to hold the second tubing in a position.

6. The mask apparatus of claim 4, wherein the hydration assembly further comprises:

a coupling coupled to the second tubing, the coupling to couple to the external hydration source.

7. The mask apparatus of claim 6, wherein the hydration assembly further comprises:

a valve coupled between the coupling and the second tubing, the valve to control flow of fluid from the external hydration source.

8. The mask apparatus of claim 1, further comprising:

a mouthpiece actuator to position the hydration assembly in response to an actuation force.

9. The mask apparatus of claim 1, wherein the moisture barrier comprises a plurality of louvres.

10. The mask apparatus of claim 1, wherein the moisture barrier comprises a check valve.

11. The mask apparatus of claim 1, wherein the one or more couplings comprise one or more straps coupled to a first side of the mask and a second side of the mask.

12. The mask apparatus of claim 1, wherein the one or more couplings comprise one or more clips to be attached to a helmet.

13. The mask apparatus of claim 1, further comprising:

an exhalation valve positioned on the front surface of the mask.

14. The mask apparatus of claim 1, further comprising:

a microphone positioned on the rear surface of the mask, the microphone to convert soundwaves into electrical energy variations.

15. The mask apparatus of claim 14, further comprising:

a speaker positioned on the front surface of the mask, the speaker to convert the electrical energy variations received from the microphone into a corresponding sound.

16. The mask apparatus of claim 14, wherein the microphone provides the electrical energy variations to a wireless communication system.

17. The mask apparatus of claim 1, wherein the rigid or semi-rigid material comprises one or more of a polymer, a plastic, a metal, or a metallic alloy.

18. The mask apparatus of claim 1, wherein the seal comprises one or more of neoprene, silicone, or rubber.

19. A mask apparatus, comprising:

a mask formed of a rigid or semi-rigid material, the mask comprising a seal disposed around a perimeter of the mask;

a breathable air mechanism detachably coupled to a front surface of the mask;

a hydration assembly to be coupled to an external hydration source;

one or more couplings to position and secure the mask apparatus; and a mouthpiece actuator coupled to a mouthpiece of the hydration assembly and extending through the front surface of the mask, wherein the mouthpiece actuator is to position the mouthpiece relative to a wearer's mouth in response to an actuation force applied to the mouthpiece actuator from outside of the mask.

20. The mask apparatus of claim 19, wherein the mouthpiece actuator comprises a spring to cause the mouthpiece to move away from the wearer's mouth.

* * * * *